Figure 1:
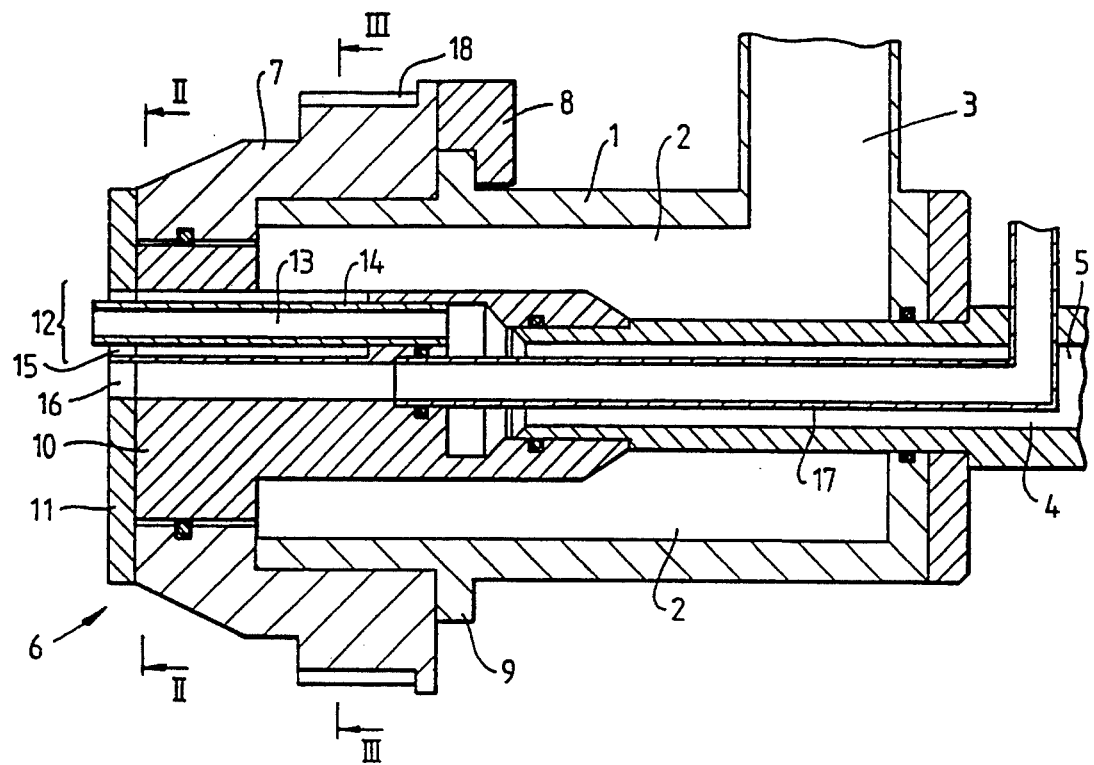

United States Patent [19]

Cockings et al.

[11] Patent Number: 5,492,706
[45] Date of Patent: Feb. 20, 1996

[54] METHOD AND APPARATUS FOR MANUFACTURING COEXTRUDED FOOD PRODUCTS

[75] Inventors: Terrence R. Cockings, Bedford; Peter T. Mawhinney, Northampton, both of United Kingdom

[73] Assignee: Unilever Patent Holdings B.V., Vlaardingen, Netherlands

[21] Appl. No.: 193,183

[22] PCT Filed: Aug. 13, 1992

[86] PCT No.: PCT/GB92/01496

§ 371 Date: Jun. 17, 1994

§ 102(e) Date: Jun. 17, 1994

[87] PCT Pub. No.: WO93/03909

PCT Pub. Date: Mar. 4, 1993

[30] Foreign Application Priority Data

Aug. 15, 1991 [EP] European Pat. Off. ............ 91307538

[51] Int. Cl.⁶ .................. A23L 1/00; A23P 1/00
[52] U.S. Cl. .................. 426/282; 425/131.1; 425/133.1; 425/382.3; 426/500; 426/516
[58] Field of Search ............................ 426/282, 500, 426/512, 516; 425/382.3, 382 R, 131.1, 133.1

[56] References Cited

U.S. PATENT DOCUMENTS

| | | | |
|---|---|---|---|
| 1,788,689 | 1/1931 | Penza | 425/382 |
| 2,856,868 | 10/1958 | Kennedy | 426/500 |
| 4,288,463 | 9/1981 | Groff | 426/500 |
| 4,859,165 | 8/1989 | Hoashi | 425/133.1 |

FOREIGN PATENT DOCUMENTS

| | | |
|---|---|---|
| 44689 | 1/1982 | European Pat. Off. |
| 300587 | 1/1989 | European Pat. Off. |
| 1349843 | 4/1974 | United Kingdom |

Primary Examiner—George Yeung
Attorney, Agent, or Firm—Cushman Darby & Cushman

[57] ABSTRACT

A method for manufacturing coextruded food products by coextruding continuous strands of one extrudable material and enveloping sheaths and twisting these sheathed strands about each other for at least part of a full revolution. An apparatus for manufacturing such products comprises a multiplicity of nozzles each having a central bore with feeding means and an annular opening surrounding this bore having separte feeding means, which nozzles are arranged for mutual movement comprising at least part of a rotation.

5 Claims, 2 Drawing Sheets

METHOD AND APPARATUS FOR MANUFACTURING COEXTRUDED FOOD PRODUCTS

Co-extrusion is a widely applied method for manufacturing compound products in various areas of industry, e.g., in plastics industry and food industry. Examples of products made thereby in the latter industry being ice cream logs having layers of different flavours and dough products enclosing a filling of fruit puree or minced meat.

Although this technique provides for a wide variety of shapes and product combinations there is still a need for further variation of shapes for improved attractiveness of tile products.

To comply with this requirement the present invention provides a method for manufacturing co-extruded products, comprising extruding a continuous strand of one extrudable material and simultaneously an enveloping sheath of a second different extrudable material wherein at least a second sheathed strand is extruded while twisting these strands about each other for at least part of a full revolution.

In a preferred embodiment the extrusion is effected through nozzles arranged on a common supporting structure.

The invention also relates to an apparatus for executing this method, comprising a multiplicity of nozzles each having a central bore having a feeding means and an annular opening surrounding said bore having separate feeding means, these nozzles being arranged for effecting a mutual movement which comprises at least part of a rotation about each other.

In a preferred embodiment these nozzles are arranged on a common structure, which is mounted for rotation about an axis.

In a very convenient embodiment of such an apparatus, for construction reasons the common structure forms a turret which is rotationally mounted on a common housing, said housing comprising at least one annular chamber having feeding means, concentrically arranged about a central chamber having separate feeding means, the annular chamber constantly communicating with the annular openings of the nozzles and the central chamber with the central bores thereof.

Using the above method and apparatus products can be produced which up till now could be made by hand only.

Figure 2:
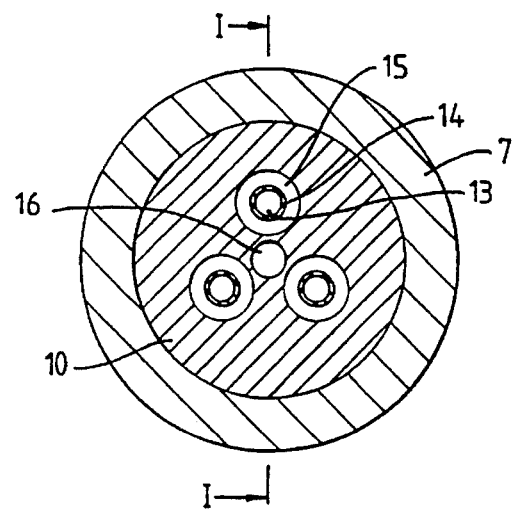
Figure 3:
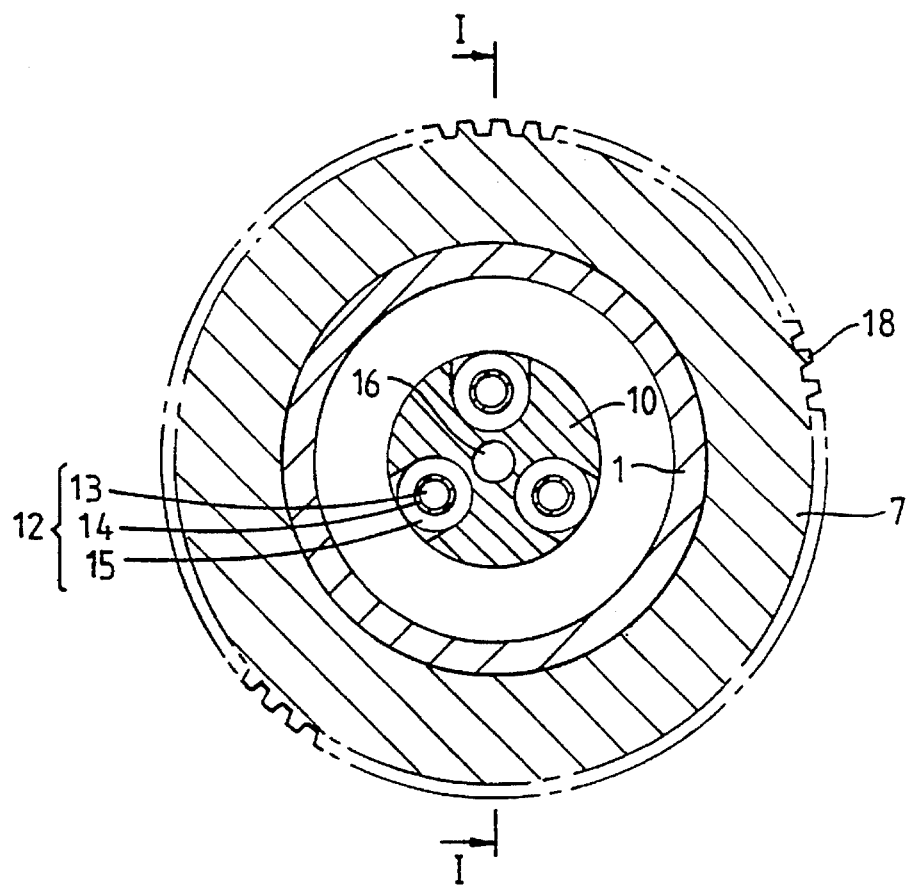
Figure 4:
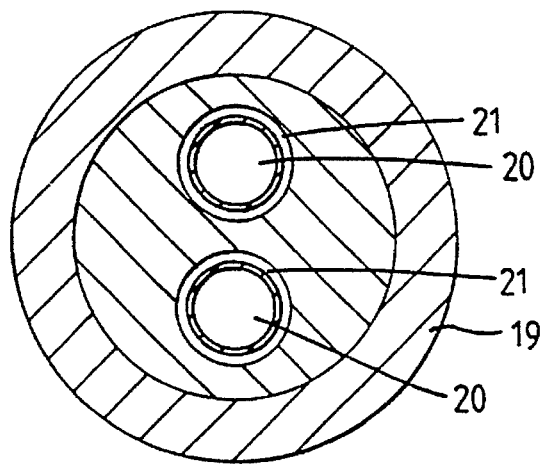

The invention will be explained in a non-restrictive manner in the following description of some preferred embodiments, reference being had to the drawings wherein FIG. 1 is an axial sectional view of an extrusion apparatus according to the invention, FIG. 2 is a cross sectional view along the line II—II in FIG. 1, FIG. 3 is a cross sectional view along the line in FIG. 1 and FIG. 4 is a cross sectional view similar to FIG. 2 of an alternative embodiment of the apparatus according to the invention.

The extrusion apparatus of the invention as shown in FIGS. 1 to 3 comprises a cylindrical housing 1, having an annular chamber 2 with a feeding conduit 3 and a central chamber 4, extending along the axis of the cylindrical housing, having a feeding conduit 5.

The annular chamber 2 is closed at one axial end and is supporting a turret 6 which is mounted for rotation at the other axial end. For convenience of manufacture and maintenance the turret 6 comprises several component parts: an annular head 7, tightly fitting about the housing, but being rotationally movable thereto, a number of clamps 8 bolted to the head and enclosing an annular outer ridge 9 and a plug portion 10 united to the annular head 7 by means of a circular front plant 11.

Suitable seals (not shown, but known as such) are provided between the housing 1 and the turret 6 and the parts thereof to prevent unintended flowing out of material from the chambers 2 and 4 but to allow mutual rotational movement between the turret 6 and the housing 1. As best may be seen from FIG. 2 the turret 6 is provided with three nozzles 12 at a uniform pitch, each having a central opening 13 communicating with the central chamber 4 through a pipe 14 supported in the plug portion 10 and an annular opening 15 communicating with the annular chamber 2 through suitable bores in the plug portion. An additional central nozzle 16 is arranged between the nozzles 12 on the axis of the turret. A feed pipe 17 is arranged along the axis of the turret and sealed thereto allowing rotational mutual movement.

The cross sectional view of FIG. 3 shows a toothed crown 18 for driving the turret 6.

In FIG. 4 an alternative embodiment of the apparatus according to the invention is shown, the difference lying in the design of the nozzles in the turret.

In this embodiment the turret 19 is provided with two nozzles similar to the ones as shown in FIGS. 1 to 3 each having a central opening 20 and an annular opening 21.

The apparatus is used as follows: One type of extrudable material is fed through the conduit 3 into the annular chamber 2 and from there through the annular openings 15, 21 in the turret 6 which is driven for rotation by a suitable motor means (not shown) camming with the toothed crown 18.

A second extrudable material is fed through the feeding conduit 5 into the central chamber 4 and subsequently through the central bores 13, 20 of the nozzles.

Co-extruded strands comprising a core of the second material and an enveloping sheathing of the first material are obtained, which due to the movement of the turret are twisted about each other. If desired a third extrudable material can be extruded through the feed pipe 17 and out of the central nozzle 16 as shown in the embodiment of FIG. 1 to 3.

Suitable combinations of materials being:

|      | first mat'l       | second mat'l         | third mat'l        |
|------|-------------------|----------------------|--------------------|
| I    | biscuit mix       | ice cream            | —                  |
| II   | brioche dough     | sausage meat         | mustard            |
| III  | brioche dough     | sausage meat         | tomato ketchup     |
| IV   | brioche dough     | cheese               | pickles            |
| V    | brioche dough     | pizza sauce          | —                  |
| VI   | brioche dough     | apple sauce          | —                  |
| VII  | short crust pastry| apple sauce          | —                  |
| VIII | potato mash       | pizza sauce          | —                  |
| IX   | potato mash       | flaked tuna          | —                  |
| X    | chicken meat      | cheese + garlic sauce| —                  |
| XI   | sausage meat      | apple sauce          | —                  |
| XII  | sausage meat      | baked bean puree     | —                  |

The extruded products were chopped in suitable lengths, for instance 8 cm for bar products or 4 cm for one-bite products. Products X to XII were coated in breadcrumbs after extrusion and cutting.

Compositions of the above ingredients were as follows: (percentage are by weight)

| Pizza Sauce | | Brioche Dough | |
|---|---|---|---|
| Mixed vegetables | 26.1% | Flour | 52.6% |
| Minced beef | 10.5% | Whole egg | 13.4% |
| Cheese | 9.9% | Fat | 9.8% |
| Tomato puree | 7.9% | Yeast | 3.0% |
| Sugars | 5.1% | Sugar | 1.5% |
| Salt | 3.6% | Salt | 0.9% |
| Starch | 3.0% | Water | 18.8% |
| Flour | 2.3% | Shortcrust Pastry | |
| Margarine | 2.3% | Flour | 56.9% |
| Flavours etc. | 1.8% | Margarine | 28.4% |
| Water | 27.5% | Full cream powder | 1.3% |
| Ice Cream | | Baking powder | 0.5% |
| Butter oil | 12.6% | Salt | 0.4% |
| Dried milk powder | 10.7% | Water | 12.5% |
| Sugar | 9.0% | Biscuit mix | |
| Dextrose | 7.0% | Digestive biscuit | 54.6% |
| Spray dried glucose | 5.0% | Golden syrup | 22.7% |
| Hazelnut paste | 2.0% | Margarine | 22.7% |
| Whey powder | 1.8% | | |
| Stabilizer + emul. | 0.5% | | |
| Water | 51.4% | | |

The other ingredients were ready retail products.

We claim:

1. A method for manufacturing co-extruded food products, comprising:

extruding a first continuous strand of one extrudable food material, simultaneously extruding an enveloping sheath of a second continuous strand of a different extrudable food material while rotating said first and second strands, thereby twisting said first and second strands about each other for at least part of a full revolution.

2. The method according to claim 1, wherein said extrusion is effected through nozzles arranged on a common supporting structure.

3. An apparatus for manufacturing co-extruded food products comprising a multiplicity of nozzles, each of said nozzles comprising a central bore and an annular opening surrounding said central bore, said central bore and said annular opening being connected to separate feeding means; and means for rotating said nozzles thereby effecting a mutual movement which comprises at least part of a rotation about each other.

4. The apparatus according to claim 3, wherein said nozzles are arranged on a common structure, which is mounted for rotation about an axis.

5. The apparatus according to claim 4, wherein the common structure forms a turret which is rotationally mounted on a common housing, said housing comprising at least one annular chamber having feeding means, concentrically arranged about a central chamber constantly communicating with the annular openings of the nozzles and the central chamber with the central bores thereof.

\* \* \* \* \*